United States Patent [19]

Garcia et al.

[11] Patent Number: 6,145,061

[45] Date of Patent: Nov. 7, 2000

[54] METHOD OF MANAGEMENT OF A CIRCULAR QUEUE FOR ASYNCHRONOUS ACCESS

[75] Inventors: David J. Garcia, Los Gatos, Calif.; David P. Sonnier, Austin, Tex.

[73] Assignee: Tandem Computers Incorporated, Cupertino, Calif.

[21] Appl. No.: 09/003,201

[22] Filed: Jan. 7, 1998

[51] Int. Cl.[7] ................................................. G06F 13/00
[52] U.S. Cl. ........................ 711/154; 711/109; 711/110; 710/54
[58] Field of Search .................................. 711/109, 110, 711/154; 709/204; 710/54, 56, 57

[56] References Cited

U.S. PATENT DOCUMENTS 5,925,099   7/1999   Futral ........................................ 709/204

FOREIGN PATENT DOCUMENTS 0 570 877   11/1993   European Pat. Off. .

OTHER PUBLICATIONS

IBM Technical Disclosure Bulletin, vol. 34, No. 6, Nov. 1991, "Concurrent Algorithm For Managing a First–In, First–Out Queue With Two–Way Pointers", pp. 80–88.

IBM Technical Disclosure Bulletin, vol. 36, No. 02, Feb. 1993 "Multi–Access First–In–First–Out Queue Using 370 Compare and Swap," pp. 327–330.

IBM Technical Disclosure Bulletin, vol. 38, No. 6, Jun. 1995 "Mechanism For Multiple Source Access Of Queues and Stacks," pp. 99–107.

*Primary Examiner*—Glenn Gossage
*Attorney, Agent, or Firm*—Townsend and Townsend and Crew LLP

[57] ABSTRACT

A circular queue is asynchronously accessed and managed by two separate processing elements. Each data element is added to the queue together with a zero data element that both marks the tail of the queue and signifies that the queue is empty. Data elements are removed from the queue in the order in which they were stored (first-in-first-out) and a manner that allows multiple, concurrent access to the queue. When the queue is accessed to remove a data element the element is first tested. If it is non-zero, the removal process continues; if zero, the queue is considered empty. The management of the queue permits dynamic re-sizing (i.e., making the queue larger or smaller) while data elements are being added and/or removed.

6 Claims, 5 Drawing Sheets

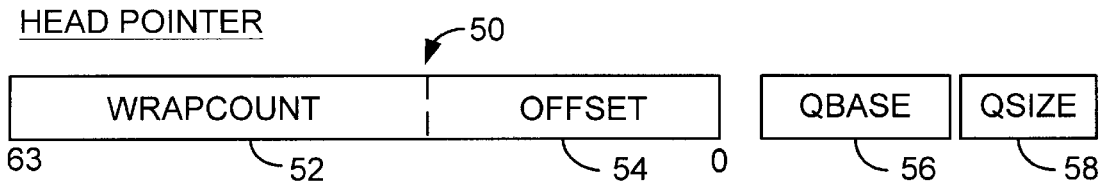
FIG. 2A.
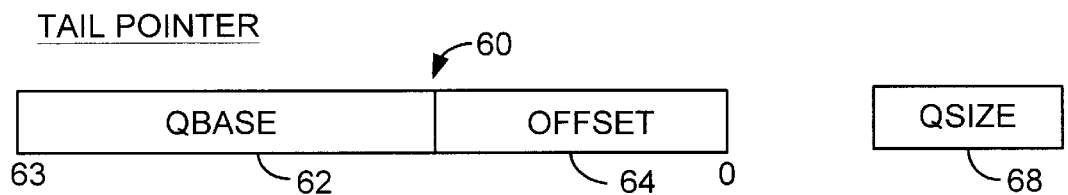
FIG. 2B.
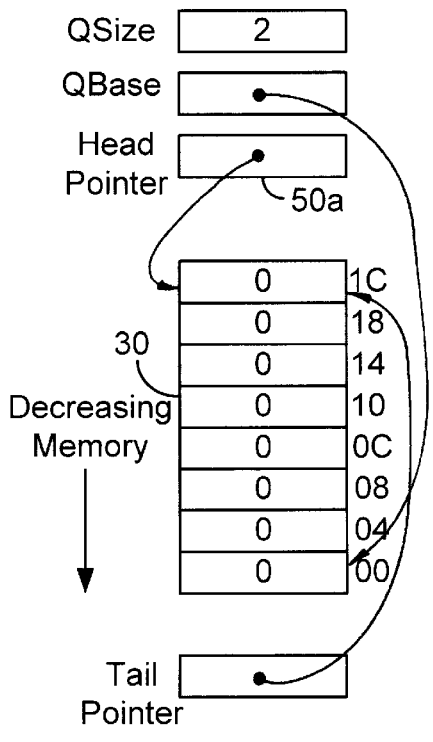
FIG. 3A.
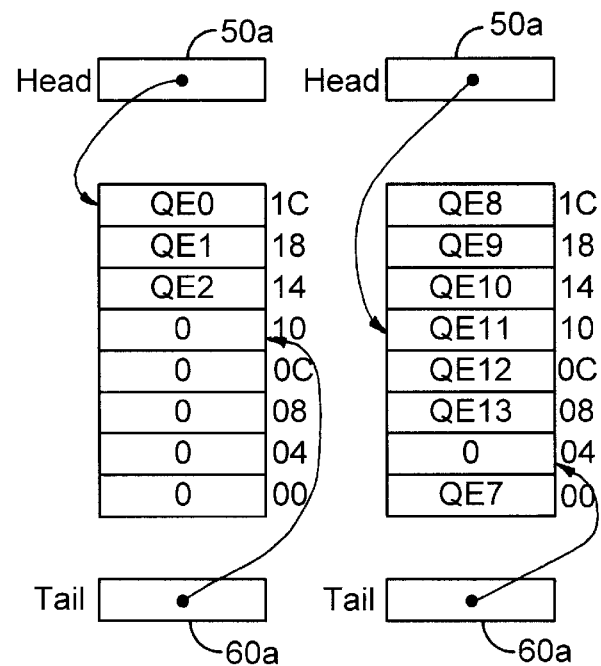
FIG. 3B.    FIG. 3C.

ENTRY ADDRESS FORMATION

REMOVING ENTRIES FROM QUEUE

METHOD OF MANAGEMENT OF A CIRCULAR QUEUE FOR ASYNCHRONOUS ACCESS

BACKGROUND OF THE INVENTION

The present invention relates generally to computing systems and in particular to a method of managing an event queue or buffer that is asynchronously accessed and managed by at least two different, unsynchronized elements.

In data processing activity it is often necessary to temporarily store data items in time-ordered fashion so that those earlier stored can be retrieved first. One method of such storage is a queue: a data structure that stores data elements that are usually retrieved in the same order they are received, i.e., a data structure that operates in accordance with a first-in-first-out (FIFO) constraint. (Other types of queues may base retrieval of data items on factors other than when stored.)

While queue operation, use, and management is relatively simple in the context of a single application/processor, queue management can become more difficult in operating environments in which there exist multiple processing units and/or processes needing access to a single queue. Typically, to ensure that the queue is not changed by a second processing unit or process while being accessed by a first processing unit or process, a lock will be established by the first processing unit/process to preclude access while it is changing or accessing the queue. In a multiple process environment (e.g., a multiple thread system) this method of ensuring queue consistency can seriously affect system efficiency. This is an especially acute problem when the threads are running as a user mode process. For example, suppose a thread seeks to access a queue, locking it to ensure it is not changed before it is through. But, before the thread can complete its use of the queue, it is preempted (i.e., its time slice has expired), and it must wait until it can again operate. Until then, the queue cannot be accessed by any other thread, process or processor.

Also, suppose the queue is used by two processing elements, one to add data elements to the queue, and another to retrieve those data elements. The queue pointers, the address information that identifies where in the queue the next data item is to be stored, or the location of the data item next in line for retrieval, must be separately managed.

Typically, one unit, for example the unit removing or pulling data from the queue, must read (or have written to it) the queue pointer of the other unit adding or pushing data onto the queue so that the two pointers can be compared to determine if the queue is empty or contains data to be pulled (removed). This separate read or write has a negative impact on performance.

SUMMARY OF THE INVENTION

The present invention provides a method of constructing and using a queue for storing data elements so that it can be asynchronously managed by separate processing elements, one to sequentially add data elements to the queue, the other to sequentially remove them from the queue in the order they were added to the queue. In addition, the method of removing the data elements is performed in a manner that allows multiple processes (e.g., multiple processes within running on one processor, or multiple processors as in a symmetric multiple processing (SMP) system, as well as multiple concurrent threads of either) to access the queue for removing data elements without conflict, and in a manner that does not unduly impede operation of the queue.

The invention is developed to avoid problems (some of which are described above) encountered when using a queue in a multiprocess environment such as may be found in a SMP system (e.g., a 4-way SMP system, comprising four processor units). An SMP system can have one or more processes concurrently running on the processor units of the system, and well as multiple threads of those processes. The invention permits data elements to be pulled ("removed") from the queue by the concurrent processes/threads without the inefficiency of software locks.

According to a broad aspect of the invention, a multiple-entry queue is formed in a circular configuration, and maintained in memory. A head pointer resides in shared memory that is used to access the entry containing the data element next to be removed—if any. Another processing element keeps a tail pointer that is indicative of the entry location whereat the next data element is to be stored. Each data element is stored together with a zero entry that marks the tail of the queue. Data elements are removed by first checking to determine if the content of the queue entry identified by the head pointer is non-zero. If so, the data element is removed by an atomic operation that uses a test and conditional store operation on the shared (by the multiple processes or threads) head pointer. First, the head pointer is checked to determine that it has not changed, i.e., that it is the same as that used to retrieve the data element. If so, the head pointer is modified to identify the entry containing the next data element to be retrieved.

The head pointer comprises an offset value and a "wrapcount" value. The offset value is combined with a base value, identifying where in memory the queue resides, to locate the head entry, i.e., the entry of the queue containing the oldest data element that is the next to be retrieved. When retrieving a data element, only the offset value of the head pointer is used (with the base value) to develop the memory address of the queue entry. However, the test and conditional store operation uses the entire head pointer, including the wrapcount (which changes each time the removal of data elements wraps around). The wrapcount is used to signal to a thread that may be pre-empted after it has read the head of the queue, but before it can perform the test and conditional store operation, that a wrap has occurred. That is, while the thread was "asleep" the addition and removal (by other threads) of data elements to and from the queue wraps around so that when the pre-empted thread is brought back, the offset value is the same as that used by the thread before pre-emption. However, the wrapcount value will have changed. Thus, the test of the head pointer will fail, and the thread will discard the data element earlier accessed. Without this feature, and under the conditions described, the awakened thread would complete the test and conditional store operation, leaving a head pointer that is indicative of the data element one beyond that next for removal.

The configuration of the queue, and the management of its pointers, according to the present invention, permits the queue to be dynamically re-sized (replaced with a larger or smaller queue) with a minimum of effort. The re-size operation can take place while data elements are being added to the queue and processes are attempting to remove older data elements from the queue. Furthermore, no software locks are required to prevent these processes from accessing the queue during the re-size operation. Broadly the steps to re-size the queue to one that is larger for example, include the steps of:

1. Allocate the physically contiguous memory for the new queue. Initialize the new queue by zeroing all the entries.

2. Temporarily let Users of the queue think it is empty by setting the Head pointer to point to a zero entry. (This will prevent access because the users will see the non-zero data element.)
3. Update the queue base address in memory, the queue size and the head pointer.
4. Update the tail pointer (used by the second processing unit) so it points to the new queue.
5. Move any remaining data elements from the old queue to the new queue.
6. If data elements are on the new queue, unblock any users waiting on the queue and let them access the new head pointer.

The invention finds particular advantage in multitasking environments due to its ability to provide concurrent access to the queue for removing data elements without the use of software locks or other means to prevent other user processes (e.g., threads) from accessing the queue when in use. That is, multiple threads or processes can pull data elements from the queue in a manner that does not require a software lock mechanism between them. This can be important given the overhead often imposed by such locking (or other) techniques. Thus, the present invention allows for efficient operation with multiple concurrent threads running to simultaneously pull items from the queue. As will be seen, the present invention also takes into account the possibility of a thread running in user mode being put to "sleep" in the middle of accessing the queue long enough so that it wraps around to the same spot. (As used herein, "user mode" is meant to refer to the processor operations performed as a result of execution of user application programs or processes, or threads of those application programs or processes; "kernel mode" is meant to refer to processor operations performed as a result of the underlying operating system running on the processor.)

Although preemption during access is provided for and even allowed, the re-sizing operation, which is done in kernel mode, is preferably performed (for performance reasons) so that steps 2 through 5 are executed without being preempted.

These and other aspects and advantages of the invention will become evident to those skilled in this art upon a reading of the following written description of the invention, which should be taken in conjunction with the accompanying drawings.

Further, data elements can be located and removed from the queue without the requirement of reading a register to determine if a new data element has arrived on the queue. In addition,

BRIEF DESCRIPTION OF THE DRAWINGS

FIGS. 2A and 2B respectively illustrate the head and tail pointer data structures used to locate the entry locations of the event queue where the data element next to be retrieved is stored and the location of the next data element is to be stored;

FIGS. 3A, 3B, and 3C diagrammatically illustrate use of an event queue according to the present invention;

DESCRIPTION OF THE PREFERRED EMBODIMENT

Figure 1:
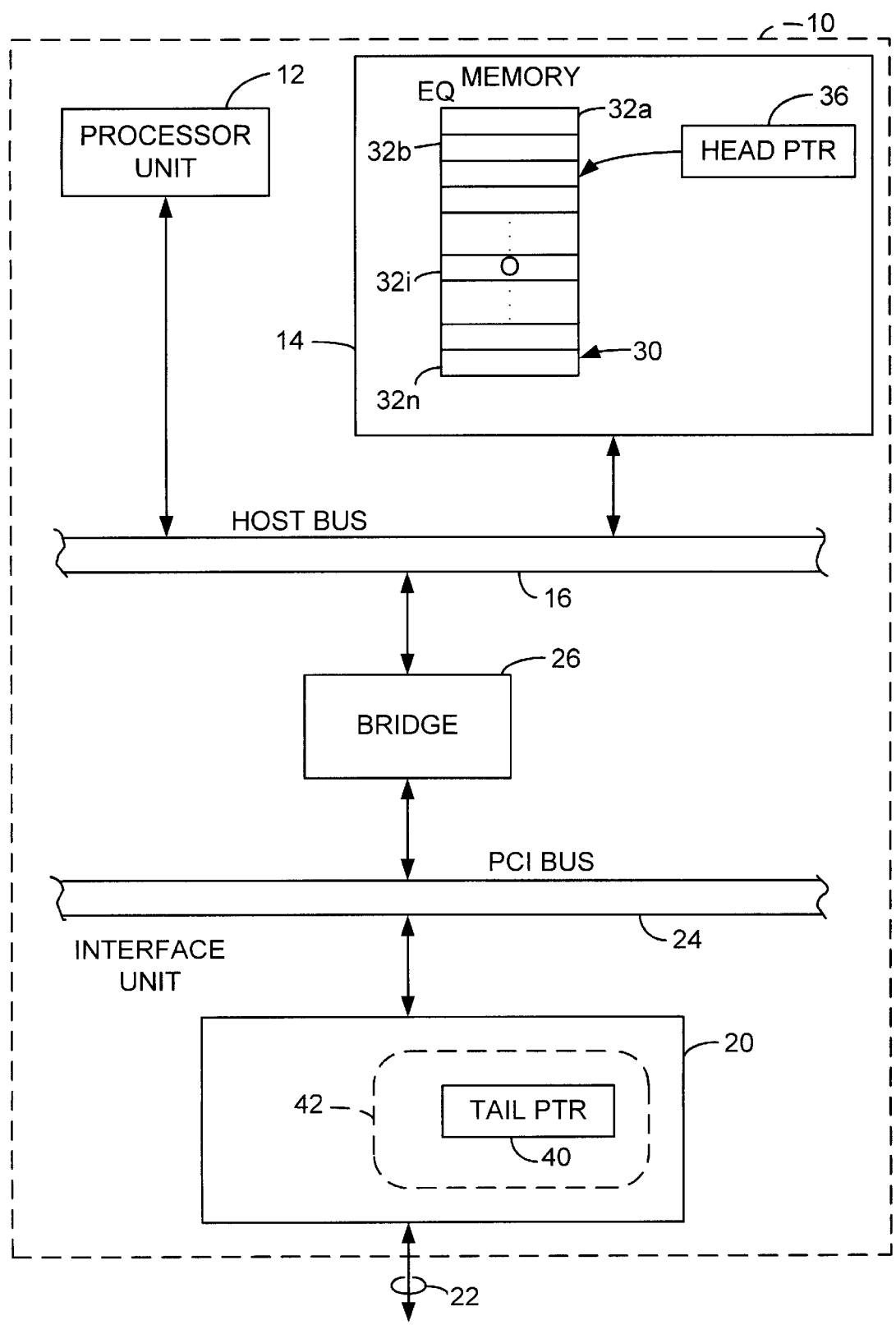
FIG. 1 is simplified block diagram illustration of computing system architecture employing the method of the present invention to manage an event queue kept in main memory.

As indicated, the present invention finds particular advantage in multiple process environment—either a multitasking or multiprocessing environments. Thus, FIG. 1 illustrates, for example, a multiple processor node 10 that forms a part of a larger system that may be configured as a multiple processor cluster. The node 10 would have, for example, multiple processors. Although only one processor 12 is actually shown in FIG. 1, in order not to over complicate the discussion, it will be appreciated by the reader that if the node 10 is configured as a SMP system, processor 12 would, in fact, be multiple processors, and will be so referenced in the remainder of this disclosure. Continuing with FIG. 1, the processor(s) 12 is(are) connected to a shared memory 14 via a host bus 16. The node 10 may communicatively connect to the remainder of the larger system of the cluster (not shown) through an interface unit 20 which handles transmission and reception tasks for the node 10. The interface unit connects to an internode bus system 22 (which may be multiple buses) that, in turn, connect to the other nodes (not shown) of the cluster. The interface unit 20 is preferably a state machine based design, although it could be microprocessor-based if speed and efficiency are not all that important.

The interface unit 20 also communicates with the processor(s)/memory 12/14 via a separate bus 24 (which could be a peripheral component interconnect—PCI—bus) and a (PCI) bridge 26. Typically, the interface unit 20 would have direct memory access (DMA) to the memory 14, according to standard PCI bus protocol.

The present invention provides a storage facility in the form of a data structure whereat data elements can be stored in time-ordered fashion, e.g., when received. For example, processes running on the processor(s) 12 may need to know when an initiated communication is sent to or received from the larger system by way of the interface unit in order to perform activities related to the communication. Or, the processes may need to know of other events that occur involving the interface unit. The present invention, then, provides a data structure, in the form of an event queue 30, for containing data elements describing events as they occur, and providing an indication of what activity needs performing, either in the form of a pointer to additional information for handling the related matter, or the data element may be self-contained, i.e., provide all the information needed to perform whatever activity needs performing relating to the event the data element describes.

The event queue 30 is an circular buffer of 4 byte entries 32 (32a, 32b, . . . , 32i, . . . , 32n), and is structured to have space for $2^n$ entries, where n ranges from 1 to 16, although there is no harm in a larger event queue. As is typical, data elements are removed from the event queue 30 in the order they were inserted, i.e., in FIFO fashion. A head pointer value 36 is kept in memory 14 where it is accessible to the processes running on the processor(s) 12. (The event queue and head pointer reside in the memory space of the process that owns, i.e., created, the event queue.) The head pointer value provides information as to the location of the entry containing the earliest-stored data element. Tail pointer information is held in a tail pointer register 40 that is preferably maintained in a memory 42 local to the interface unit 20. The content of the tail pointer register 40 points to the event queue entry (32i in FIG. 1) of the event queue 30 at which the next data element added will be stored.

The interface unit 20 adds event queue entries (QE) 32 to the tail, and processes running on the processor(s) 12 remove queue entries from the head. The interface unit 20 adds items to decreasing addresses in the queue 30, that is the queue grows to lower memory.

The content of the tail register 40, the tail pointer value, always points to an queue entry 32 of the event queue 30 that contains a zero (e.g., entry 32i in FIG. 1). The interface unit 20 writes this zero entry when it adds a new data element to the event queue 30, and decrements the tail pointer value. If the event queue is empty, the head and tail values will point to the same zero entry. Of course, using a zero entry to identify the tail of the queue will consume one of the 2n entries in the event queue 30. Therefore, only $2^n-1$ entries in an event queue are usable.

Digressing for a moment, the zero data element performs an important function: to provide an indication of whether or not the queue is empty. Prior queue management techniques would compare the head pointer and tail pointer values to one another: if they were equal, the queue was considered empty; if not, the queue was considered not empty. But, this approach would require that either the interface unit 20 write the head pointer value to the memory 14, or that the processor(s) 12 read the tail pointer register 40, to make the head and tail pointer values available for the comparison. This, however, would be inefficient and costly (in terms of time). Instead, according to the present invention, writing a zero data element one beyond each data element stored by the interface unit 30 is, when retrieved and examined, used to denote that the queue was empty. Thus, the zero data element identifies to the removal process, when tested, that the queue is empty. And, it is better that the entity adding data elements to the queue write this "empty" flag. If the processes or threads removing data elements were used to write the zero, pre-emption problems discussed above would also operate here to cause problems (i.e., a thread being pre-empted before it can store a zero might result in a subsequent thread removing a stale date element).

As shown, there is no virtual to physical address translation logic, and the interface unit 20 requires that the event queue 30 be physically contiguous. The event queue start address need only to be 4 byte aligned. While the event queue must have 2n entries, there is no requirement that the event queue be aligned to a 2n boundary.

Preferably, the event queue 30 is physically contiguous and appear in the user-mode process's virtual address space. Thus, the memory for the event queue 30 must be allocated to be physically contiguous, and then mapped into virtual space for a client-process. A single 4kilobyte (KB) page can hold 1024 event queue entries. A larger event queue will require two or more physically contiguous pages.

The tail pointer information, and is preferably never read from or written to by a user agent. Rather, it is believed better that an operating system (Kernel agent) be designated to write the tail pointer information to the tail pointer register 40 only when creating the event queue 30 or re-sizing the event queue (discussed further below). The tail pointer can be initialized to anywhere in the event queue 30. In the example shown in FIGS. 3A–3C, discussed below, the head pointer and tail pointer were initially set to Base+$2^{Qsize+3}-4$, the highest addressed entry in the event queue.

When the event queue 30 is created, there are several items written to the tail pointer register 40 to describe the location in memory of the tail of the event queue 30, including:

Tail Offset: The offset, in number of entries of the event queue 30, from the base to the current (empty, or zero) tail location.

Queue Size. The total number of entries in the event queue is $2^{Qsize+1}$. An entry containing all zeros is used to mark the tail of the queue so the number of usable entries is $2^{Qsize+1}-1$.

Queue Base Address: The address of the lowest entry in the queue.

FIG. 2A shows the head pointer information. A 64-bit data word 50 contains the head offset 54 and wrapcount 52 values. In addition to this is the base address 56, QBase, of the location of the event queue 30 in memory 14, and a queue size value 58 (QSize) that is indicative of the size of the queue. The tail pointer information is shown in FIG. 2B as a 64-bit data word 60 (kept in the tail pointer register 40—FIG. 1), containing the location in memory of the event queue 30, QBase 62, and the offset 64 into the event queue to the entry containing a zero data element to demark the tail of the queue. The interface unit 20 also has a queue size value 68 (QSize), describing the size of the queue.

Referring now to FIGS. 3A–3C, an example of the construction and use of the event queue 30 is illustrated. Referring first to FIG. 3A, the QBase value is shown as pointing to the location in the memory 14 (FIG. 1) at which the bottom or base of the event queue 30 resides. The head and tail pointer values contain offsets into the event queue 30: respectively, (1) the entry 32 of the queue 30 whereat the next data element to be removed is located, and (2) and the tail of the queue. (The size of the queue is 8 entries. Thus, a size value (QSize) 68 is maintained for reasons that will be explained below, and identifies actual size of the event queue 30, in terms of the number of entries. The size value, plus 1, forms a power of 2 to define the number of queue entries. Thus, with a size value of 2, the event queue is defined to have 8 ($2^{2+1}$) entries.)

Continuing, FIG. 3A shows an empty event queue 30 having eight entries. Thus, the head tail pointer values 50a, 60a will point to the same (empty) entry. Now, assume that the interface unit 20 adds three data elements, QE0, QE1, and QE2, to the event queue 30 as illustrated in FIG. 3B. The head pointer value 50a will point to the first data element, QE0, inserted in the queue 30 by the interface unit 20, and will continue to do so until that data element is removed from the queue. The tail pointer value 60a now points to the entry one past the last data element (QE2) inserted by the interface unit 20. Before each data item is inserted by the interface unit 20, a zero data element is written to the entry that immediately follows. Thus, when the data element QE2 was written to the entry location 14 (hexadecimal), a zero data element was written to the entry location 10 (hexadecimal). This is done as a single 8 byte block write operation on the PCI bus. A PCI block write starts at the lowest addressed 4 bytes and writes to the highest 4 bytes. Therefore, PCI block write operation always writes the zero data element before writing the new data element to the event queue 30.

FIG. 3C shows the event queue 30 after the interface unit 20 has inserted eleven more data elements, and eleven data elements have been removed from the queue by processes (threads) running on the processor(s) 12. Note that the tail pointer information is still left pointing to a queue entry (at location 04) that contains a zero value.

The interface unit 20 is preferably configured to perform only a single PCI block write for each data element written to the event queue 30, and should not be required to do a separate write to the shared memory 14 for the tail pointer.

In addition, if a PCI bus is used to allow the interface unit 20 to communicate with the processor(s)/memory 12/14, note should be taken of the fact that, compared to PCI write operations, reads across the PCI bus 24 are relatively slow. The interface unit 20 should not have to do a PCI read of the memory 14 in order to manage the event queue 30. Similarly, a process running on the processor(s) 12 should not have to perform a PCI read of an interface unit 20 resident register (e.g., tail pointer register 40) in order to manage the event queue 30. Accordingly, the processor(s) 12 (i.e., processes) should not have to read the tail pointer register 40 in order to determine if an item is on the queue. And, concurrent threads should be able to remove items from an event queue 30 without employing any kind of locking mechanisms.

As indicated above (with respect to FIG. 2A), the head pointer information is not a simple pointer to the current head data element in the event queue 30. Instead, the head pointer information is actually a 64 bit (aligned to an 8 byte boundary) combination of the wrapcount 52 and an offset value 54. The offset value 54 of the head pointer information is added to the event queue base value 56 to produce the address of the desired event queue entry. Since the event queue can be of variable size, a mask computed from the QSize value, is needed to separate the wrapcount 52 field from the offset 54 field. Shown in FIG. 4 is a diagram that illustrates this operation.

Figure 4:
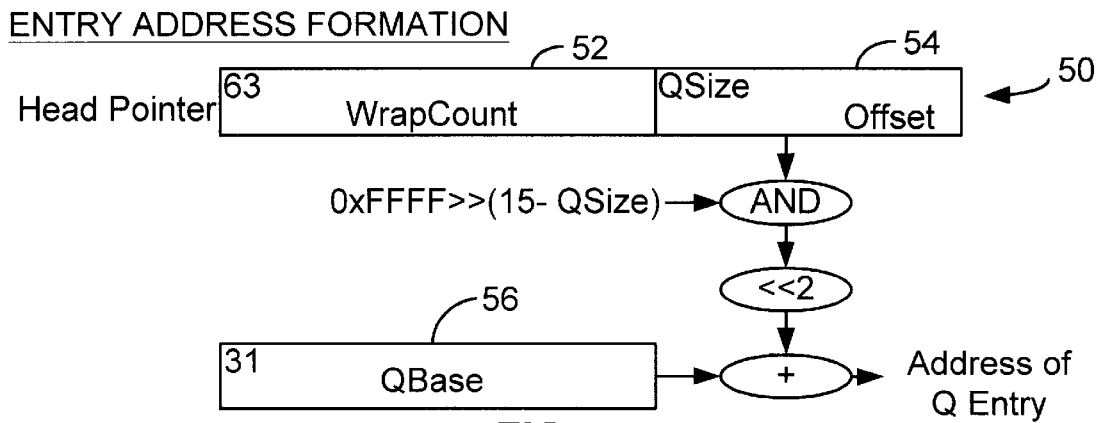
FIG. 4 illustrates the procedure used to form the head pointer used to locate the data element in the queue next to be retrieved.

As FIG. 4 shows, the 64-bit word, containing the wrapcount and offset 52, 54, is ANDed with a value that is based upon the size of the event queue 30 so that only the offset value 54 is passed. The offset is then left-shifted 2 bit positions (to account for the fact that each entry is four bytes), and added to the value QBase. The result is the memory location of the entry that forms the head of the event queue 30.

The memory location of the queue containing the zero data element, marking the tail of the queue (and one entry just beyond the last data element added) is formed in the same manner, i.e., according to the procedure shown in FIG. 4, using the tail pointer information 60 (QBase 62 and offset 64—FIG. 2B) and QSize 68. (Of course, it will be evident that the QBase and QSize values 52/66, 58/68 used to develop the entry addresses for the head and tail are the same.)

The actual value of the wrapcount value is not important for address calculations. It is only used by the operation that updates the head pointer as discussed further below. The wrapcount value 52 ensures that a stale offset value 54 does not mistakenly match an offset that has already wrapped around. The event queue head pointer wrapcount value is preferably initialized with a random number.

The event queue 30 grows to low memory. To advance the pointer one item, the entire 64-bit head pointer word 50 is decremented by one. This will correctly advance the wrapcount value 52 when the event 30 wraps since decrementing the offset value, which is always between 0 and $2^n-1$, will carry from the low order offset field and will decrement the wrap field.

Figure 5:
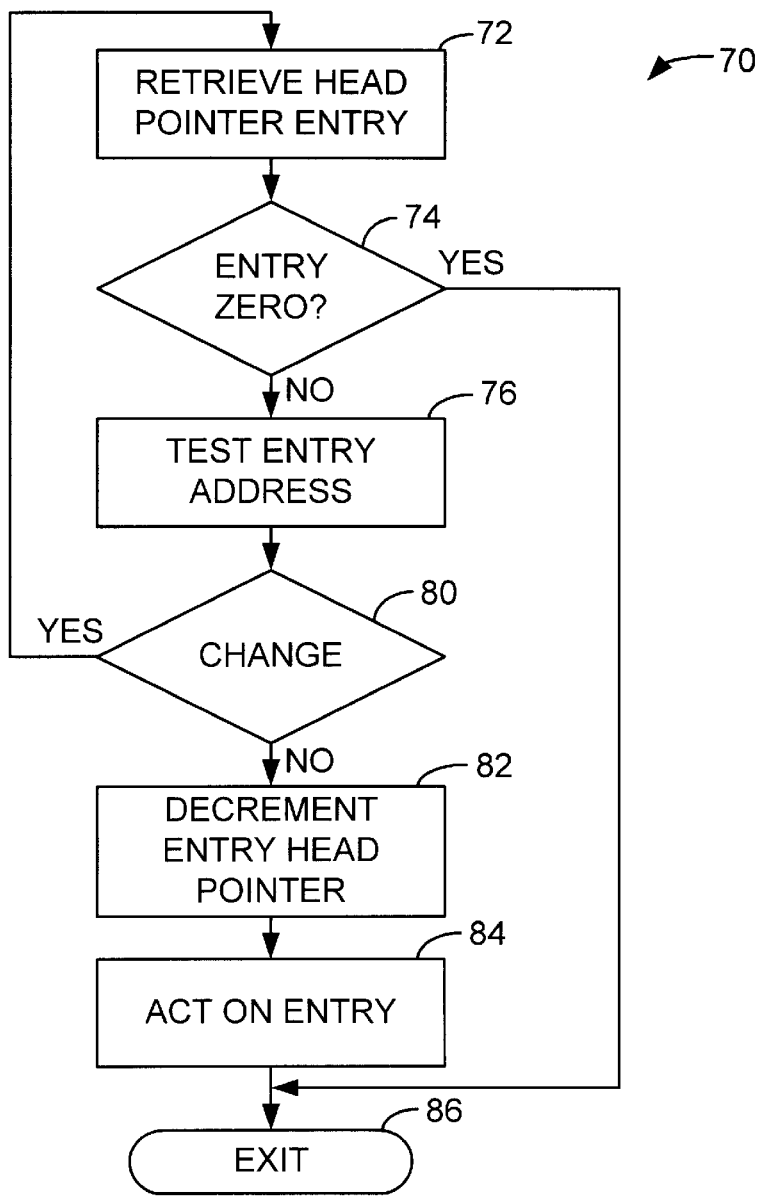
FIG. 5 illustrates generally the steps taken to retrieve a data item from the queue.

Referring now to FIG. 5, the procedure 70 used to remove data elements from the event queue 30, and the concomitant updates of the head pointer value with each removal, is generally illustrated. First, a process or thread running on the processor(s) 12 (FIG. 1) will determine if any data elements are on the event queue 30 by checking if the head pointer value 50 (combined with the QBase value 56) points to a non-zero entry. Accordingly, the value at the queue entry 32 pointed to by the head pointer information is pulled from the 35 queue at step 72 and examined at step 74. If the retrieved data element is a zero entry, then the event queue 30 is empty, and the procedure 70 will exit via step 86.

There may be concurrent threads running, each checking the event queue 30 and attempting to simultaneously remove items from the queue. Therefore, removal of a data element from the event queue preferably is done with an atomic operation that performs a test and conditional store operation to change the head pointer information 50 to point to the next entry in line, such as the compare and store operation performed by the InterlockedCompareExchange function available on the Windows NT operating system and supported by newer microprocessors (e.g., the Pentium Pro manufactured by Intel Corporation). (Windows, and Windows NT are trademarks of Microsoft Corporation of Redmond, Wash.; Pentium and Pentium Pro are trademarks of Intel Corporation.) Thus, if the data element pulled from the event queue 30 is non-zero, the procedure 70 moves from the step 74 to the step 76 where a test is made (steps 76, 80) of the entry address (i.e., the head pointer information) to see if it has changed from that used to retrieve the data element from the event queue. If so, such change indicates that the data element has been pulled from the event queue by another process or thread (also operating under the procedure 70), and the procedure for the current executing process or thread will return to step 72 to attempt to remove the next data element in the event queue.

If, however the test shows that the entry address remains unchanged, the procedure moves to step 82 to decrement the head pointer information 50 as indicated above. Step 82 is followed by step 84 where the data value removed is used, and then step 86 where the procedure 70 is exited. Step 82 is preferably part of an atomic operation with steps 76 and 80.

The following pseudo code illustrates removal of a data element from the event queue 30. The 64-bit wrapcount/offset is masked and used as an offset into the event queue. As indicated above, to pop a queue entry, the head of the queue is checked for a non-zero entry. If non-zero, the procedure attempts to write the new decremented head pointer with a compare & swap instruction. If the queue is empty, it returns a zero entry in Qitem.

```
ULONG Qpop (LONGLONG *Qhead, PULONG Qbase, ULONG Qsize)
{
  ULONG Qitem;
  LONGLONG   current;
  ULONG mask = 0xffff >> (15-Qsize) ;
  current=*Qhead;
  Qitem=Qbase[current & mask] ;
  while(Qitem != 0)
  {
  if (current == interlockedCompareExchange64(CQHead,
    --current, current) break;
  current='CQHead;
  Qitem=Qbase[current & mask]
  return Qitem;
}
```

To understand the need for the wrapcount value 52, consider a thread that attempts to remove a data element from the event queue. It first reads the head pointer information and the data element at the head of the event queue, after which it does an atomic compare and swap operation with the head pointer information. But, if in a multitasking environment, the thread presently in the process of removing a data element might get preempted for an arbitrary amount of time between reading the head pointer information 50 and executing the compare and swap. Assume that before the thread is able to complete, the event queue has wrapped completely around and now has the same head pointer offset. By including the wrapcount in the compare and swap operation this problem is minimized. To have the same problem with the wrapcount/head offset included in the same word, the thread would have to be preempted for the exact amount of time for both the offset and wrapcount to rollover to the same value. Since the wrapcount/offset information (i.e., the head pointer information 50) is 64 bits, and it is assumed that a data element will not be removed from the event queue 30 any faster than once per microsecond, a thread would have to be preempted for $2^{64}*10^{-6}$ seconds or 585,000 years to hit this race condition. (In contrast, a 32-bit wrapcount/offset value would allow this race condition window to happen in 71 minutes).

The interface unit 20 maintains the tail pointer information that includes the base address (QBase 62) of the queue 30 in memory, the size of the queue (QSize 68), and the offset (64) into the queue (see FIG. 2B). Since only the interface unit 20 adds data elements to the queue there is no need for the interface unit 20 to maintain a wrapcount.

When the interface unit 20 adds a data element to the tail of the queue 30, it first zeros the entry one beyond the tail. That is, the interface unit always writes two four-byte quantities each time it adds an data element to the queue. First, the interface unit 20 writes a zero entry one past the tail, then it writes the new data element to the location pointed to by the tail. The interface unit writes the zero to ensure there is always a zero entry at the tail of the queue. Processes and/or threads running on the processor(s) 12 cannot be relied upon to write this zero entry. Since the process or thread removing data elements from the queue 30 most likely will be running in a user mode, it might be preempted at any time. If a thread is preempted after it has advanced the head pointer, but before it can write a zero to the queue tail, another thread would not know where the queue tail is. The user application or process threads could use a software lock to control their access to the queue. That way, if one thread was preempted at an inopportune time, the other threads wouldn't be able to access the queue. While this would work correctly, it would be inefficient—a user thread holding the lock can be preempted which stops all threads from using the event queue. The scheme provided by the present invention allows multiple concurrent user threads to access the event queue 30 without using software lock mechanisms.

Writing the zero entry before writing the new queue data element is the reason the queue grows into lower memory addresses. According to the standard PCI bus protocol, multiple writes are available, starting from the lower address. For the interface unit to ensure the zero entry is written before the new item, it must write the zero to a lower address, hence the queue grows into lower addresses.

An event queue could be made to grow into increasing memory addresses. The interface unit 20 need only write three 4-byte words for each data element added: first the new queue tail would be written; then two entries containing zeros. This ensures there is no window in time in which a zero is not located at the end (tail) of the event queue 30. However, this approach wastes two queue entries (instead of one) and will require more bus cycles according to conventional PCI protocol.

A special case exists when the tail offset value is zero and the queue is about to wrap. The addition of a data element is done in two parts (order is important):

1) First, the 4-byte zero (0000 0000h) data element is written to the address of the entry that forms the top of the event queue 30 (i.e, the highest addressed entry for a queue that grows into lower addresses—before wrapping back to the highest addressed entry);

2) Then, the 4-byte data element is written to the location of the queue entry holding the prior written zero entry—the bottom (i.e., the lowest addressed entry for an event queue that grows into lower addresses) of the queue.

After the data element is added to the event queue, the tail offset is decremented by one (modulo QSize). There is no full or overflow detection; overflows merely wrap the pointer back to the top.

A novel aspect of the invention is the ability to dynamically resize an event queue during operation. That is, a new event queue can be created, and data elements in the event queue being replace are migrated from the old queue to the new while data elements are being added to and removed from the old queue. The basic steps for resizing an event queue are:

1. Allocate the physically contiguous memory for the new queue, and initialize the new queue by zeroing all the entries.
2. Temporarily let users (e.g., threads) of the old queue think the queue is empty by setting the head pointer information 50 to point to a zero entry. (This will prevent access because the users will see the non-zero data element.)
3. Update the queue base address in memory, the queue size and the head pointer.
4. Update the tail pointer information maintained by the interface unit 20 so that it points to the new queue.
5. Move any remaining data elements from the old queue to the new queue.
6. If data elements are on the new queue, unblock any users waiting on the queue and let them access the new head pointer.

Figure 6A:
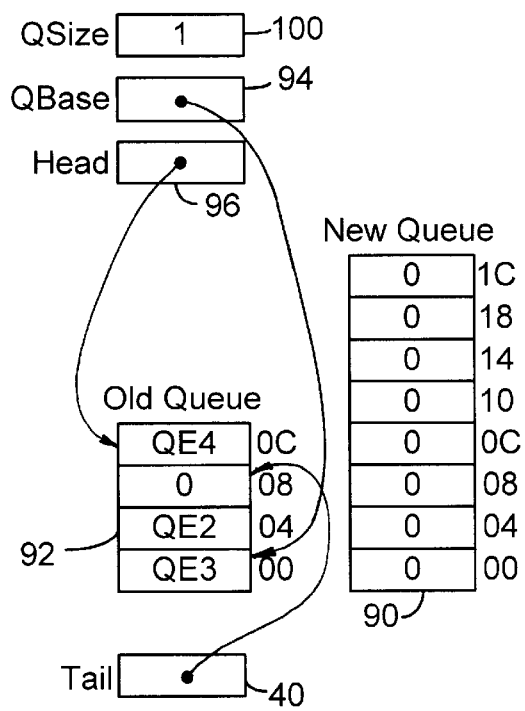
FIGS. 6A–6G diagrammatically illustrate the steps taken to dynamically re-size an established, used queue according to the present invention.

FIGS. 6A through 6G illustrate these steps, and the following discussion explains them in more detail. FIG. 6A illustrates the first step: allocation of memory to the new event queue 90. In this example, the old event queue (92) is 4 entries in size (QSize=1), and the new queue 90 is eight entries in size (QSize=2).

Figure 6B:
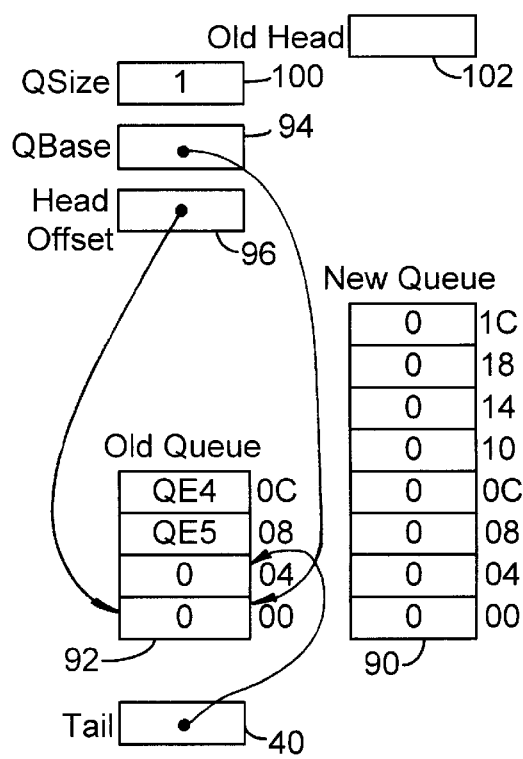

The next step in the re-sizing operation, illustrated by FIG. 6B, is to temporarily let the user processes/threads think the old event queue 92 is empty by making the head pointer information (e.g., QBase 94 and head offset 96) point to a zero entry. The interface unit 20 may still be allowed to add data elements to the old event queue's tail.

As explained above, and as illustrated in FIG. 2A, the head pointer information 50 is made up of the wrapcount/offset which, together with QBase and QSize variables, are used to form the physical address of the queue head entry. Since these values cannot all be updated atomically, they have to be updated in a series of steps so that any user accessing the old event queue during the re-size operation will compute an address that points to a zero entry.

First, a zero is written to the one entry in the old queue that can always be guaranteed to be zero: the item just above the current queue head (i.e. the item with a higher address than the queue head). Since the queue will not overflow, the interface unit 20 will never write anything but a zero to the queue entry just above the head. Then, the head offset value 54 is changed (written) to point to this newly zeroed entry.

When re-pointing the head offset, an atomic compare and swap is preferably used to ensure both that the correct entry was cleared and the old head entry is preserved for a later step in the resize operation. A failure of the compare and swap operation will result in simply starting over again with the new head offset.

Figure 6C:
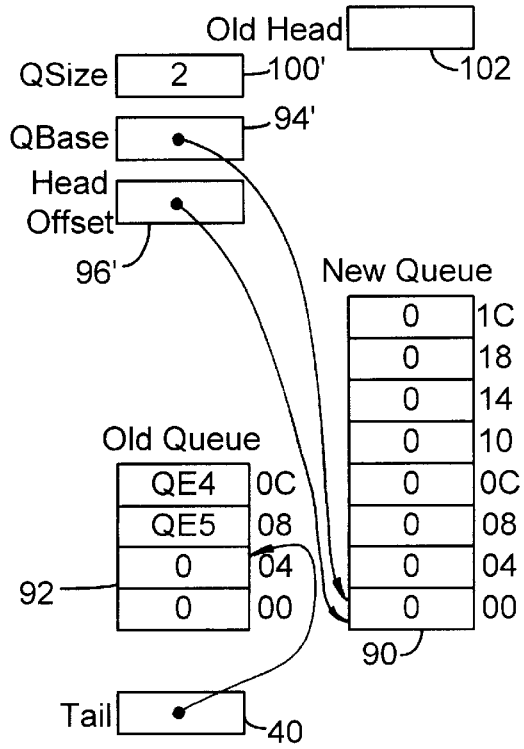

Next the values for the base address (QBase 94) and queue size (QSize 100) values are modified to reflect those of the new queue, followed by modification of the wrapcount/offset values that make up the head pointer information 50 (FIG. 2A). This is illustrated in FIG. 6C in which the QBase, QSize and head offset values are denoted with reference numerals 94', 96', and 100', and are now shown pointing to the new queue 90. The order of these operations is important because since all three updates are not atomic, users of the old queue can be accessing the head pointer during the update and might compute an address with the old offset but the new QBase address value. At each step of the update, the head pointer information must be such to point to an item in the new queue that is zero. As FIG. 6C shows, this step results in the head pointer information 50 (specifically, the combinations of the QBase address value 94' and the head offset value 96') pointing to the base of the new queue which contains a zero data element.

The old QBase and QSize 94, 96 values are updated atomically with a 64-bit store. The QBase value is set to the lowest address of the new event queue and QSize value is set to $\log_2$(#entries in new queue)−1. Since the new queue in this example has 8 entries, QSize is set to 2.

The head pointer information 50 (wrapcount/offset values 52, 54—FIG. 2A) is also preferably updated atomically with a 64 bit store operation. Before the update, the upper 32 bits of the 64 bit wrapcount/head offset is decremented. This ensures that the new wrapcount/offset will be different from the previous one. Decrementing just the wrapcount portion isn't straight forward since, when the queue is re-sized, the wrapcount portion of the word is shifted. Decrementing the high order 32 bits accomplishes the same goal and is simpler to do.

The head offset value 54 must be set to one more than what the tail offset value 64 (FIG. 2B) will be initialized to. This ensures that new items added by the interface unit 20 to the new queue won't interfere with the old items as they're copied from the old queue onto the new queue. In this example, the tail offset value 64 will be pointed to an entry located at memory address 1C, so the head offset will be set to point to address 00 in this example.

Figure 6D:
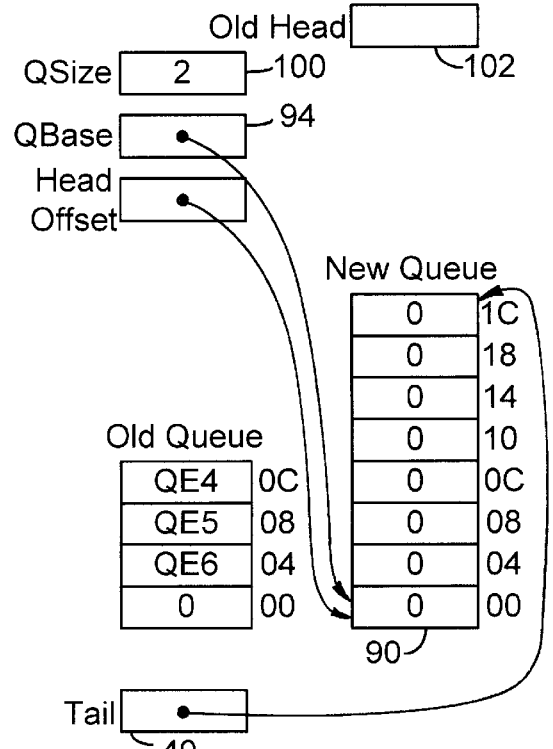

Next, the tail pointer register 40 is written with new QBase and offset values 62, 64, to point to the entry location 1C of the new event queue 30 as illustrated in FIG. 6D. The interface unit 20 will not add data elements to the location pointed to by the head pointer information 50 since the user's software will ensure that the queue will not overflow.

If the event queue 30 is being re-sized to a smaller queue (i.e., the new queue is smaller than old queue), it is expected that the user's software will ensure that there can be no more than QSize(new queue) data elements on the old event queue before the re-size operation is started.

Now, the re-size operation is ready to proceed to migrating any data elements from the old event queue to the new one. This will require modification of the head offset value 96'. Accordingly, the re-size operation must first determine the number of data elements (QE4, QE5, QE6 FIG. 6D) remaining in the old event queue 92. This can only be done now since the interface unit 20, at this point of the process, had been adding data elements to the old queue. The number of data elements added to the old queue is just the number of entries containing those elements between (that is, counting down from) the data element pointed to by the old values for QBase and offset (94, 96) head pointer information value 50 (in this example, "Old Head" 102) and the first zero entry. Call this NumOldEntries, which in this example is 3 (FIG. 6D).

Figure 6E:
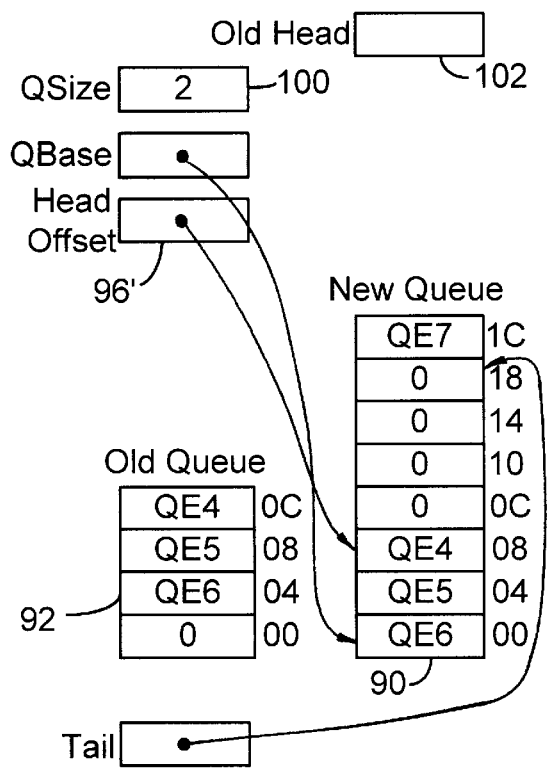
Figure 6F:
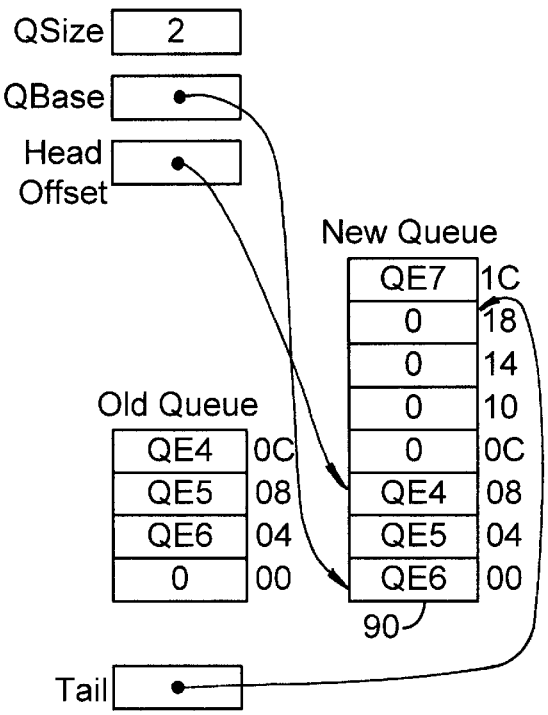

Update the head offset value 96' so that it points to NumOldEntries more than the original value of the tail offset. In this example the new queue's original tail offset points to entry 1C (FIG. 6D) and NumOldEntries is 3. The Head offset is then set to point to entry 08 (FIG. 6E). Then, any remaining data elements are moved from the old queue to the new queue. The move operation is performed so that the oldest data element from the old event queue (QE4; FIGS. 6D and 6E) is moved last. After this last move, the head offset value 96' will be pointing to the oldest item from the old event queue and the new queue is fully functional. Users (processes/threads) will now see a non-zero item at the head of the queue and may start pulling data elements from the queue.

The interface unit 20 will simultaneously add data elements to the new queue. But since the queue won't overflow, additions to the new event queue won't conflict with the copying of the data elements from the old queue.

During the event queue re-size operation the head pointer information 50 (i.e., the off set value 54) was set to a value that pointed to a zero data element so that users accessing the queue for removal of data elements would think the queue was empty. As a result, in a multitasking environment, there may be threads blocked even though the event queue is actually not empty. As the last step in the re-size operation, the appropriate number of threads should be unblocked if there are data elements on the queue.

Figure 6G:
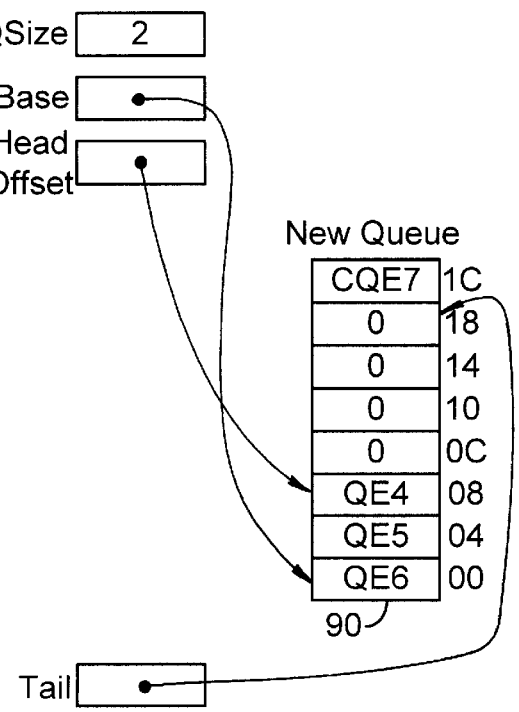

Finally, the memory used by the old queue 92 (FIG. 6F) must be deallocated (FIG. 6G). However, if the old queue 92 is simply deallocated there is a potential problem. Consider a thread in the process of examining the old queue for a new entry. It computes the head entry address as discussed above, and is then preempted. When the thread restarts, the new queue has been created and the old queue deallocated. The thread will get a memory protection error when it reads what it thinks is the address for the head of the queue. The thread would never use the data from this read—the compare and swap would fail and the thread would simply compute a new head pointer (which would point to the new queue) and try again.

There may be cases in which the event queue could overflow, i.e., the addition of data elements begins to overwrite the older data elements stored in the event queue 30 and awaiting removal. Detection and prevention of overflow can be accomplished by having the kernel agent (i.e., operating system of the processor(s) 12)) periodically writing the head pointer to a memory register (not shown) of the interface unit 20. Interface unit will then be able to periodically check the memory register containing the head pointer, and compare it with the content of the tail pointer register 40 in order to not let the tail of the event queue 30 not pass the most recently written value of the head pointer.

What is claimed is:

1. A method of asynchronous storage of data elements received from a second processing component for retrieval by a first processing component, comprising:

providing the first processing component with a memory;

forming in the memory a data structure having a plurality of storage locations for storing data elements received from the second processing component in time-ordered, sequential relation;

providing the first processing component an interface unit communicatively coupled to the second processing component, the interface unit including storage for holding a head pointer address indicative of a storage location whereat a received data element is to be stored;

providing the first processing component a tail pointer address indicative of a storage location in the data structure whereat a next data element is to be retrieved;

storing each data element received from the second processing component at the storage location indicated by the head pointer address in a sequence in order of receipt together with a predetermined value data element at a storage location immediate sequential to that of the received and stored data element;

setting the head pointer address to be indicative of the location in the data structure of the predetermined value data element; and retrieving a data element from the location indicated by the head pointer address, and if the predetermined value data element doing nothing, else, resetting the head pointer address to a next stroage location.

2. The queue of claim 1, wherein the predetermined value is zero.

3. The method of claim 1, including the steps of forming the tail pointer address from a base address indicative of a storage location in the memory of the data struture and a tail index indicative of a stroage location in the data structure, and forming the head pointer address from a copy of the base address and a head index indicative of the storage location or another storage location in the data structure.

4. The method of claim 3, and providing a base address that is indicative of a lowest numbered address of a storage location of the data structure.

5. The method of claim 4, wherein the retreiving step included resetting the head pointer address by decrementing the head index.

6. A computing system, comprising:

a first processing node having a memory and an interface unit, the memory having formed therein a queue with a plurality of storage locations;

a second processing node communicatively coupled to the interface unit to send data elements for storage in the queue, the data elements received from the second processing component being stored in the queue in a sequential manner in terms of when received;

the interface including storage having a head pointer address indicative of a one of the plurality of storage locations whereat a received data element is stored together with a predetermined data element in a next sequential storage location of the queue; and means for retrieving data elements from the queue in the order received and if the retrieved data element is the predetermined value, doing nothing, else changing the head pointer address to be indicative of another of the plurality of storage locations.

* * * * *